United States Patent [19]

Washizuka et al.

[11] 4,202,607
[45] May 13, 1980

[54] MIRROR WITH INFORMATION DISPLAY

[75] Inventors: Isamu Washizuka, Kyoto; Satoshi Teramura, Kashiwara; Masanori Matsuishi, Nara, all of Japan

[73] Assignee: Sharp Kabushiki Kaisha, Osaka, Japan

[21] Appl. No.: 876,244

[22] Filed: Feb. 9, 1978

Related U.S. Application Data

[63] Continuation of Ser. No. 667,620, Mar. 17, 1976, abandoned.

[30] Foreign Application Priority Data

| Mar. 17, 1975 | [JP] | Japan | 50-32652 |
| Apr. 15, 1975 | [JP] | Japan | 50-46229 |
| May 23, 1975 | [JP] | Japan | 50-62730 |
| Jun. 3, 1975 | [JP] | Japan | 50-75678 |
| Aug. 7, 1975 | [JP] | Japan | 50-109852 |

[51] Int. Cl.² .................................................. G02F 1/13
[52] U.S. Cl. ................................ 350/338; 350/288; 350/336; 368/10
[58] Field of Search ............... 350/338, 288, 336; 58/152 R; 40/28 B, 219

[56] References Cited

U.S. PATENT DOCUMENTS

| 1,909,362 | 5/1933 | Keith | 350/288 X |
| 1,948,222 | 2/1934 | La Hodny | 350/288 X |
| 2,094,322 | 9/1937 | Hannings | 58/152 X |
| 2,132,476 | 10/1938 | En Holm | 40/219 |
| 3,612,654 | 10/1971 | Klein et al. | 350/339 |
| 3,772,685 | 11/1973 | Masi | 350/311 X |
| 3,807,831 | 4/1974 | Soref | 350/336 X |
| 3,814,501 | 6/1974 | Schindler | 350/338 |

*Primary Examiner*—Edward S. Bauer
*Attorney, Agent, or Firm*—Birch, Stewart, Kolasch & Birch

[57] ABSTRACT

A display such as a liquid crystal display unit, a light emitting diode assembly, or an electroluminescent element is arranged behind a front glass window of a mirror for indicating, for example, current time information or calculator output information. A switching means is provided for controlling the enabling and disabling of the display. The display section forms a part of the mirror when the display is not enabled. In a preferred form, a liquid crystal display unit of the reflection type is attached to the rear surface of the front glass window of the mirror. The reflection film of the liquid crystal display unit functions as a reflection film of the mirror when the display is disabled, thereby forming a continuous mirror assembly even at the display section. That is, there is no distinction between the display region and the normal mirror region.

18 Claims, 26 Drawing Figures

MIRROR WITH INFORMATION DISPLAY

This application is a continuation, of copending application Ser. No. 667,620, filed on Mar. 17, 1976, now abandoned.

BACKGROUND AND SUMMARY OF THE INVENTION

The present invention relates to a mirror and, more particularly, to a mirror having information display ability.

An object of the present invention is to provide a mirror including a display arranged behind a front glass window of the mirror for indicating, for example, current time information or calculator output information.

Another object of the present invention is to provide a mirror including a display arranged behind a front glass window of the mirror, the display section forming a part of a continuous mirror when the display is not enabled.

Still another object of the present invention is to provide a liquid crystal display unit of the reflection type suited for forming a part of a continuous mirror when the display is not enabled.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to one embodiment of the present invention, a liquid crystal display unit of the reflection type is attached to a rear surface of a front glass window of a mirror. A reflection film formed on the rear surface of the front glass window of the mirror except a display section, where the liquid crystal display unit is disposed, forms a continuous mirror in combination with a reflection electrode included within the liquid crystal display unit. A touch sensitive switching means is provided on a frame of the mirror to disable the liquid crystal display unit when a continuous mirror surface is required.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
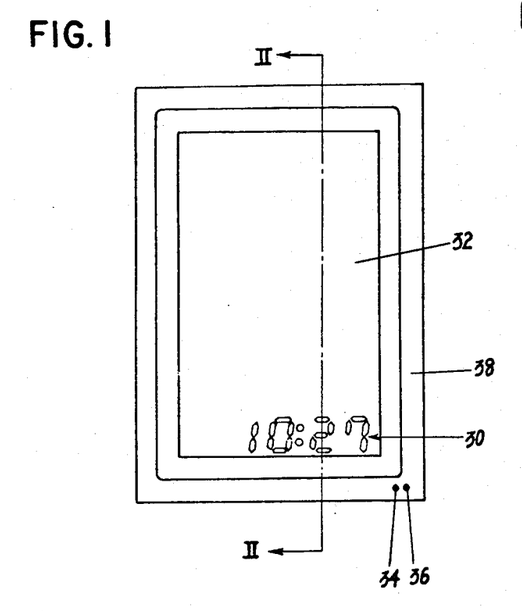
FIG. 1 is a front view of an embodiment of a mirror of the present invention including a liquid crystal display unit of the reflection type.
Figure 2:
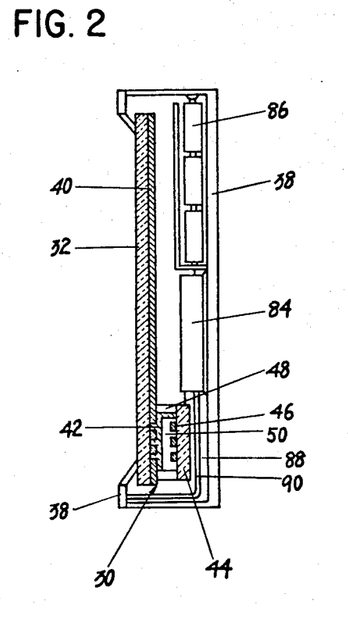
FIG. 2 is a sectional view as seen at II—II of FIG. 1.

Referring now to FIGS. 1 and 2, there is illustrated an embodiment of a mirror of the present invention, a liquid crystal display unit 30 is attached to a rear surface of a front glass window 32 of a mirror. The front glass window 32 serves as a glass substrate of the liquid crystal display unit 30, which indicates, for example, current time information.

Switching terminals 34 and 36 are formed on a frame 38 of the mirror. The switching terminals 34 and 36 are associated with a driving circuit, which will be described later, for enabling the liquid crystal display unit 30. When the operator touches the switching terminals 34 and 36 to connect them with each other, the liquid crystal display unit 30 is disabled, thereby forming a continuous mirror surface.

A reflection film 40 made of aluminum is formed on the rear surface of the front glass window 32 of the mirror through the use of evaporation technique or etching technique. The reflection film 40 is removed at portions corresponding to a segment pattern to be formed on the liquid crystal display unit 30 as shown in FIG. 2. A transparent common electrode 42 is formed on the rear surface of the front glass window 32 and on the reflection film 40 at the display section through the use of evaporation technique. The transparent common electrode 42 is preferably made of metal oxide such as tin oxide or indium oxide.

Another glass substrate 44 is disposed in such a manner to confront the transparent common electrode 42 formed on the front glass window 32. Segment electrodes 46 of the reflection type made of aluminum are formed on the glass substrate 44 in a configuration suited for displaying characters such as numerals. The segment electrodes 46 are preferably formed slightly larger than the removed portions of the reflection film 40. A spacer 48 is disposed between the reflection film 40 and the glass substrate 44 to determine the distance between the transparent common electrode 42 and the segment electrodes 46 between which a liquid crystal composition 50 is filled. A desired voltage is applied across the liquid crystal composition 50 to enable the indication of, for example, current time information through the use of the transparent common electrode 42 and the segment electrodes 46 as is well known in the art.

It will be clear from the foregoing description that a continuous mirror surface is created when the liquid crystal display unit 30 is disabled, because one of the reflection film 40 and the segment electrodes 46 of the reflection type is formed at the back of the front glass window 32 to cover the whole of the rear surface of the front glass window 32.

Figure 3:
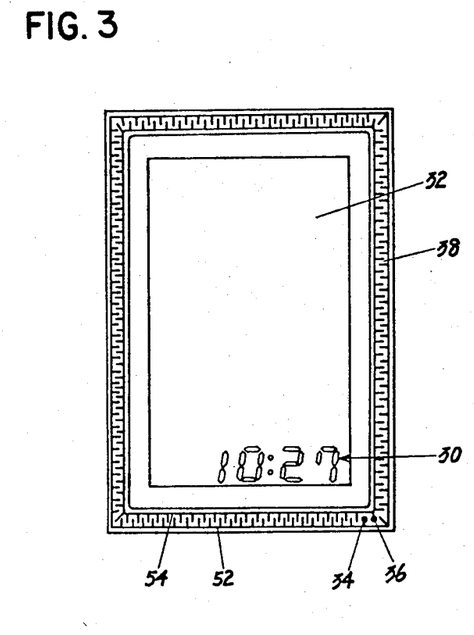
FIG. 3 is a front view of another embodiment of a mirror of the present invention including a liquid crystal display unit of the reflection type.

FIG. 3 shows another embodiment of the mirror of the present invention. Like elements corresponding to those of FIG. 1 are indicated by like numerals. Comb shaped electrodes 52 and 54 connected to the switching terminals 34 and 36, respectively, are formed on the frame 38 of the mirror to surround the front glass window 32, thereby facilitating the switching operation, of which the switching circuit will be described later.

Other examples of the liquid crystal display section will be described with reference to FIGS. 4 through 7. Like elements corresponding to those of FIGS. 1 through 3 are indicated by like numerals.

Figure 4:
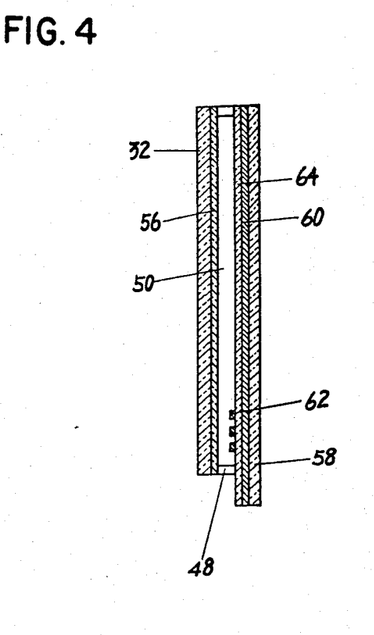
FIG. 4 is a sectional view of still another embodiment of a mirror of the present invention.

Referring now to FIG. 4, a transparent common electrode 56 is uniformly formed on the rear surface of the front glass window 32 of the mirror. Another glass substrate 58 is disposed in such a manner to confront the front glass window 32. A reflection film 60 made of aluminum is uniformly formed on the glass substrate 58, and then segment electrodes 62 of the reflection type made of aluminum are formed on the reflection film 60 via a transparent, insulating film 64. The spacer 48 is disposed between the transparent common electrode 56 and the transparent, insulating film 64 to determine a cavity in which the liquid crystal composition 50 is filled. This example can reduce the fabrication steps of the mirror because the etching treatment is required only once in this example.

Figure 5:
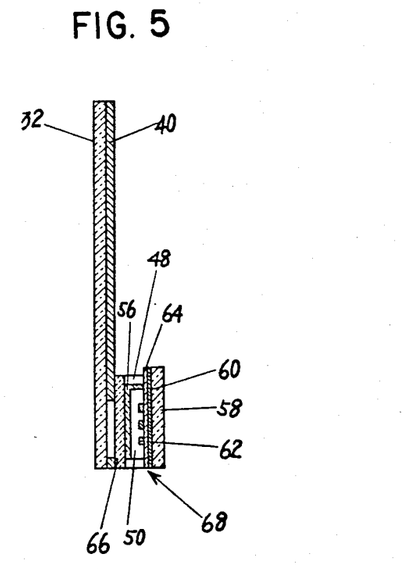
FIG. 5 is a sectional view of yet another embodiment of a mirror of the present invention.

Referring now to FIG. 5, a liquid crystal display unit 68 constructed in accordance with the embodiment of FIG. 4 is removably attached to the front glass window 32 of the mirror, thereby facilitating the exchange of the liquid crystal display unit 68. The reflection film 40 is formed on the rear surface of the front glass window 32 of the mirror except the display section at which the liquid crystal display unit 68 is attached. The reference number 66 designates an additional glass substrate for supporting the liquid crystal display unit 68.

Figure 6:
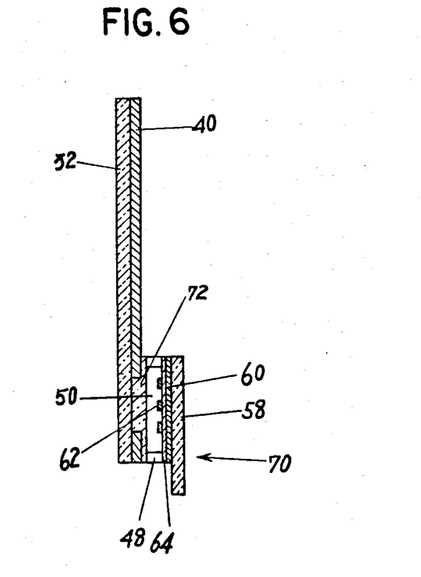
FIG. 6 is a sectional view of a further embodiment of a mirror of the present invention.

Referring now to FIG. 6, the reflection film 40 is formed on the rear surface of the front glass window 32 of the mirror except the display section at which a liquid crystal display unit 70 is attached. A transparent common electrode 72 is formed on the rear surface of the front glass window 32. The reflection film 60 made of aluminum is uniformly formed on the glass substrate 58, and then segment electrodes 62 of the reflection type are formed on the reflection film 60 via a transparent, insulating film 64. The spacer 48 determines a cavity in which the liquid crystal composition 50 is filled in such a same manner as the embodiment shown in FIG. 4.

Figure 7:
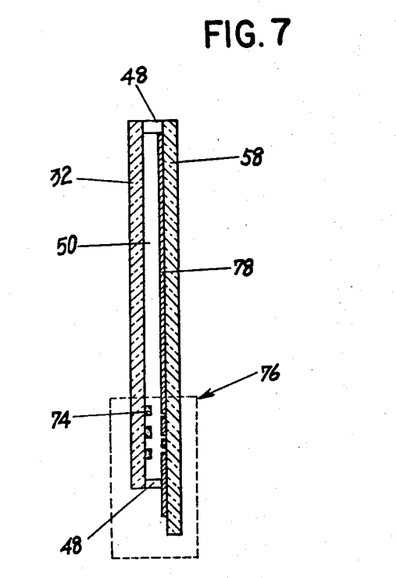
FIG. 7 is a sectional view of a still further embodiment of a mirror of the present invention including a liquid crystal display panel of the reflection type.

Referring now to FIG. 7, transparent segment electrodes 74 are formed on the rear surface of the front glass window 32 at a display section 76. A reflection film 78 is formed on the rear glass substrate 58.

Figures 8, 9:
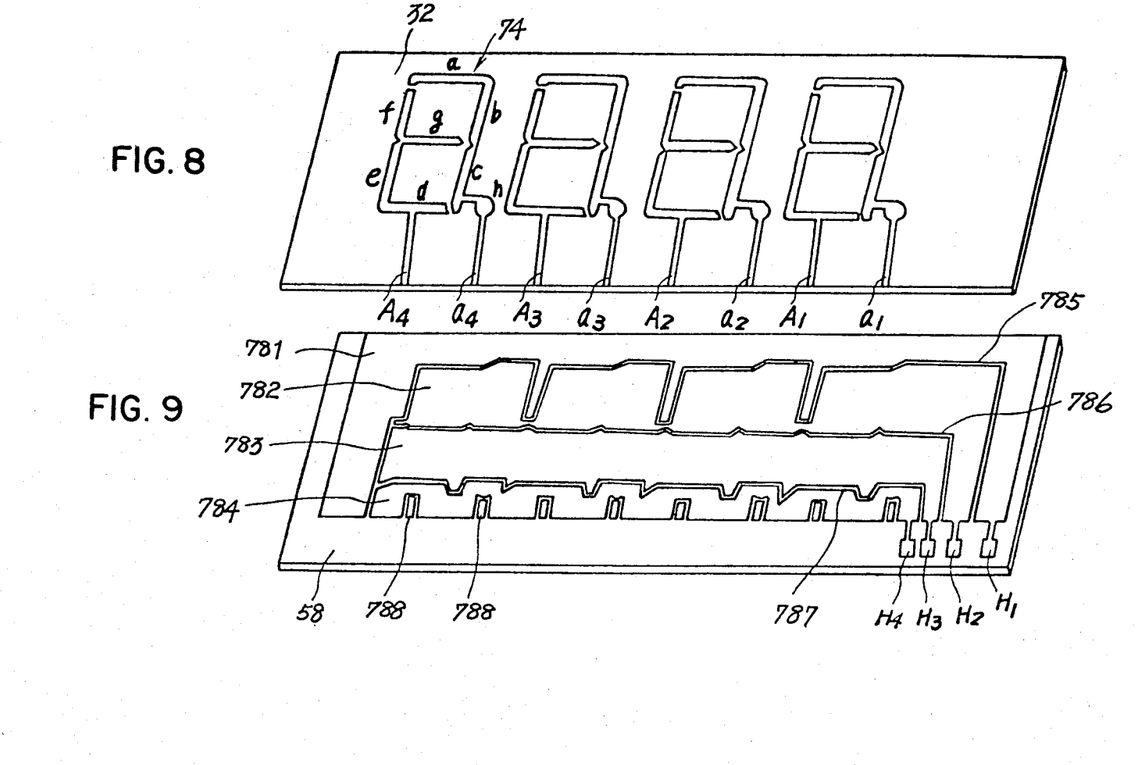
FIG. 8 is a perspective view of a segment electrode pattern of the liquid crystal display panel included within the embodiment of FIG. 7.
FIG. 9 is a perspective view of a reflection electrodes pattern of the liquid crystal display panel included within the embodiment of FIG. 7.

FIG. 8 shows a pattern of segment electrodes 74 formed on the front glass window 32, and FIG. 9 ahows a pattern of the reflection film 78 at the display section 76. The reflection film 78 is uniformly formed on the rear glass substrate 58 except the display section 76.

A plurality of segment electrodes a, b, c, . . . , and h made of a transparent metal film such as an indium oxide film are formed at the respective digit positions on the rear surface of the front glass window 32 as shown in FIG. 8 through the use of evaporation technique or photoetching technique. The segment electrodes 74 in the respective digit positions are divided into two groups. The segment electrodes 74 in the respective groups are connected with each other in common and the respective groups are connected to receive selection signals via terminals $a_1$ through $a_4$ and $A_1$ through $A_4$.

Plural reflection electrodes $78_1$, $78_2$, $78_3$ and $78_4$, which are parts of the reflection film 78, made of, for example, aluminum are formed on the rear glass substrate 58 as shown in FIG. 9 through the use of evaporation technique or printing technique at the display section 76. The reflection electrodes $78_1$, $78_2$, $78_3$ and $78_4$ are continuously formed in common to the respective digit positions in such a manner that the reflection electrodes are provided even at the spaces positioned between adjacent digit positions or among the segment electrodes in the respective digit positions.

The reflection electrodes $78_1$, $78_2$, $78_3$ and $78_4$ are separated from each other by thin gaps $78_5$, $78_6$ and $78_7$, which are formed by peeling off the reflection film 78 made of aluminum in a slit like fashion through the use of photoetching technique or printetching technique. It will be clear from FIG. 9 that the thin gaps $78_5$, $78_6$ and $78_7$ are formed along the longitudinal edge of the display section 76, thereby to continuously provide the reflection electrodes $78_1$, $78_2$, $78_3$ and $78_4$ in common to the respective digit positions. The width of the thin gaps is preferably selected narrower than one hundred and several tens micronmeters.

The segment electrodes a, b, c and h in the respective four digit positions are connected with each other in common to receive selection signals through the terminals $a_1$, $a_2$, $a_3$ and $a_4$ of the respective digit positions. The remaining segment electrodes d, e, f and g are also commonly connected with each other to receive selection signals applied to the respective terminals $A_1$, $A_2$, $A_3$ and $A_4$ which are provided for the respective digit positions. Needless to say, the terminals $a_1$–$a_4$ and $A_1$–$A_4$ are also made of the transparent metal film such as the indium oxide film.

The reflection electrodes on the rear glass substrate 58 are formed in the following manner:

The reflection electrode 781 confronts the segment electrodes a and f in the respective digit positions and is connected to receive a selection signal via a first terminal $H_1$. The reflection electrode 782 confronts the segment electrodes b and g in the respective digit positions and is connected with a second terminal $H_2$. The reflection electrodes 783 confronts the segment electrodes c and e in the four digit positions and is connected with a third terminal $H_3$, and the reflection electrodes 784 confronts the segment electrodes d and h and is connected to receive a selection signal through a fourth terminal $H_4$.

The reflection electrodes 781, 782, 783 and 784 are continuously formed in common to the respective digit positions, as already discussed above, and spaced away from each other by the thin gaps 785, 786 and 787. The operator can hardly recognize the thin gaps and, therefore, the reflection electrodes cover practically the whole surface of the rear glass substrate 58.

Figure 10:
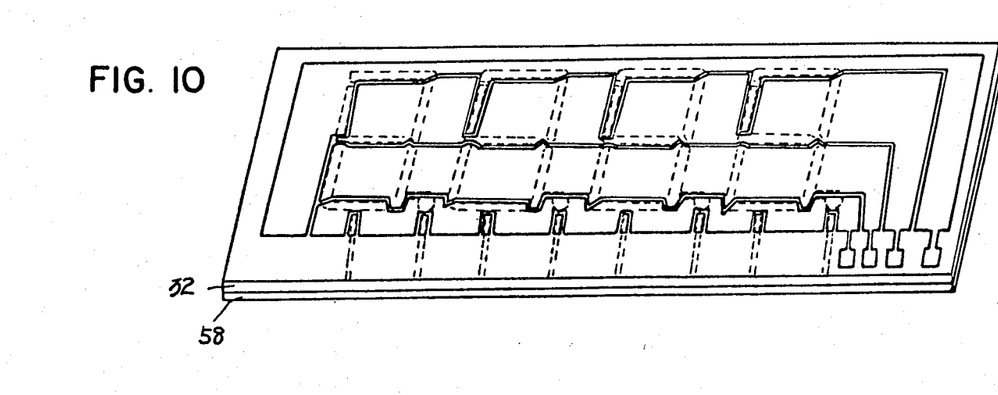
FIG. 10 is a perspective view of the liquid crystal display panel included within the embodiment of FIG. 7, which comprises the segment electrodes of FIG. 8 and the reflection electrodes of FIG. 9.

The rear glass substrate 58 carrying the reflection film 78 and the reflection electrodes 781, 782, 783 and 784 formed thereon is disposed at the back of the front glass window 32 at a predetermined distance from the front glass window 32 through the use of the spacer 48, and the liquid crystal composition 50 is filled therebetween to form the mirror having the liquid crystal display section 76 as shown in FIGS. 7 and 10. Reflection plates 788 made of aluminum are formed on the rear glass substrate 58 at the positions corresponding to the terminals $a_1$ through $a_4$ and $A_1$ through $A_4$. The reflection plates 788 are electrically isolated from the reflection electrodes 781, 782, 783 and 784. With such an arrangement, the reflection film is positioned uniformly throughout the whole of not only the normal mirror region but also the display section 76.

When the segment a in the first digit position is desired to be selected for display, the terminal $a_1$ for the segment electrodes a, b, c and h in the first digit and the first terminal $H_1$ for the reflection electrode 781 are operatively selected to receive the selection signals for display.

Detailed construction of the liquid crystal display section 76 of the embodiment shown in FIGS. 7 through 10 and a control circuitry thereof is fully understood and described in co-pending application Ser. No. 870,210 filed on Jan. 17, 1978 and which is a continuation of abandoned application Ser. No. 582,079 entitled LIQUID CRYSTAL DISPLAY, filed on May 30, 1975, by Isamu Washizuka and Yoshio Takeda, assigned to the same assignee as the present invention, the disclosure of which is incorporated herein by reference.

Figure 11:
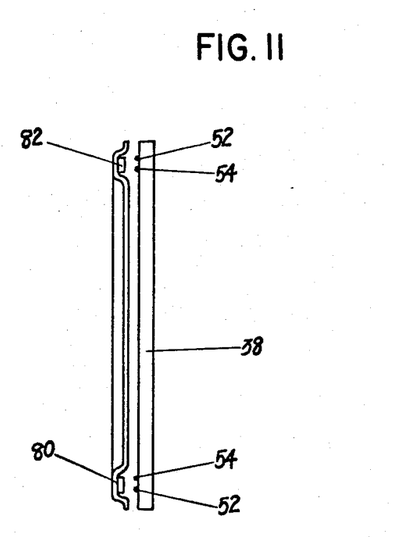
FIG. 11 is a sectional view showing another switching structure of the present invention.

FIG. 11 shows another embodiment of the switching structure. A rubber switch assembly 80 including a conductive rubber contact 82 is disposed on the comb shaped electrodes 52 and 54 in such a manner to surround the mirror surface or along the frame 38 of the mirror, the comb shaped electrodes 52 and 54 being clearly shown in FIG. 3. This rubber switch assembly 80 functions to protect the comb shaped electrodes 52 and 54 from the surrounding environment.

Referring again to FIG. 2, a circuit assembly for activating the liquid crystal display unit 30 will be described hereinbelow. A large scale integrated circuit (referred to as LSI hereinafter) 84 is mounted on the frame 38 of the mirror in order to enable the liquid crystal display unit 30. The LSI 84 includes time calculation circuitry comprising an oscillation circuit, a frequency division circuit and a counter circuit, and drive circuitry for developing a driving signal for activating the liquid crystal display unit 30. A battery assembly 86 is provided for supplying the LSI 84 and the liquid crystal display unit 30 with power. Needless to say, a commercial power source can be used for activating the LSI 84 and liquid crystal display unit 30. The switching terminals 34 and 36 are connected to the LSI 84 through wires 88 and 90 to control the enabling and disabling of the liquid crystal display unit 30 as already discussed above.

Figure 12:
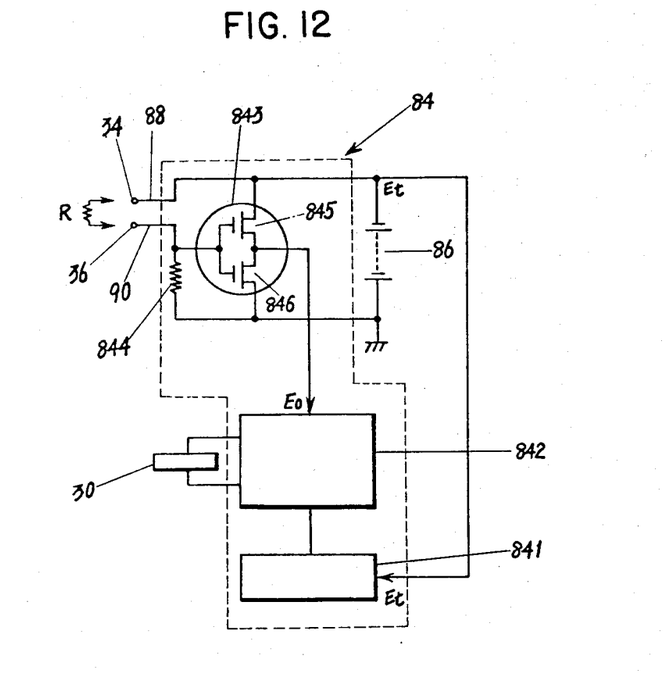
FIG. 12 is a schematic circuit diagram of a driving circuit for activating the liquid crystal display unit of the present invention.

A typical circuit diagram for driving the liquid crystal display unit 30 and associated with the switching terminals 34 and 36 is shown in FIG. 12. The LSI 84 includes time calculation circuitry 841, drive circuitry 842, a C-MOS (complementary-metal oxide semiconductor) 843 and a resistor 844. The battery assembly 86 supplies the time calculation circuitry 841 with a voltage $E_t$. The liquid crystal display unit 30 is connected to receive a driving signal from the drive circuitry 842.

The C-MOS 843 comprises an N-channel MOS transistor 845 and a P-channel MOS transistor 846, the gate electrodes thereof being connected with each other and then connected to the switching terminal 36 via the wire 90. The gate electrodes of the two MOS transistors 845 and 846 are also connected to the source electrode of the P-channel MOS transistor 846 through the resistor 844 (about 1 megaohm). The drain electrode of the N-channel MOS transistor 845 is connected to the switching terminal 34 via the wire 88. The output terminal of the C-MOS 843 is connected to the drive circuitry 842 to control the enabling and the disabling of the liquid crystal display unit 30.

When the switching terminals 34 and 36 are connected with each other through a resistor R of the operator's body, a voltage level applied to the gate electrodes of the MOS transistors 845 and 846 becomes negative and, hence, the P-channel MOS transistor 846 becomes conductive. Therefore, a voltage level $E_0$ applied through the drive circuitry 842 to the segment electrodes of the liquid crystal display unit 30 becomes approximately zero volts, whereby the liquid crystal display unit 30 is disabled because the common electrode of the liquid crystal display unit 30 receives a voltage level of zero volts.

When the switching terminals 34 and 36 are not connected with each other through the resistor R of the operator's body, a voltage level applied to the gate electrodes of the MOS transistors 845 and 846 is zero volts and, hence the N-channel MOS transistor 845 is conductive. Therefore, the segment electrodes of the liquid crystal display unit 30 receive a voltage $E_0$ of approximately $E_t$ volts via the drive circuitry 842, whereas the common electrode of the liquid crystal display unit 30 receives a voltage level of zero volts, whereby the liquid crystal unit 30 is enabled to indicate the current time information stored in the time calculation circuitry 841.

Although in the foregoing embodiments the switching terminals 34 and 36 are provided, a conventional touch sensitive electronic switching circuitry can be employed of which the touch sensitive electrode is formed on the front glass window 32 of the mirror.

Moreover, a timer arrangement can be disposed between the output terminal of the C-MOS 843 and the drive circuitry 842, whereby the liquid crystal display unit 30 is disabled for a predetermined time period following the touch operation of the operator to the switching terminals 34 and 36. Needless to say, when the liquid crystal display unit 30 is disabled, the display section and the normal mirror resion form, in combination, a continuous mirror surface.

Figure 13:
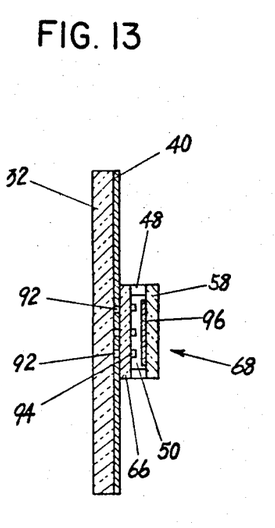
FIG. 13 is a sectional view of another embodiment of a mirror of the present invention including a liquid crystal display unit of the reflection type.
Figure 14:
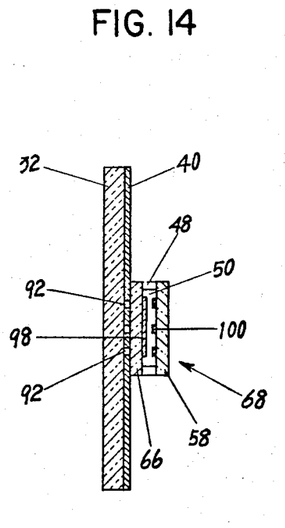
FIG. 14 is a sectional view of still another embodiment of a mirror of the present invention including a liquid crystal display unit of the reflection type.

FIGS. 13 and 14 show other embodiments of the mirror of the present invention wherein the liquid crystal display unit 68 is removably attached to the rear surface of the mirror. Like elements corresponding to those of FIG. 5 are indicated by like numerals.

Tthe reflection film 40 formed on the rear surface of the front glass window 32 of the mirror is removed at positions 92 corresponding to the segment electrodes of the liquid crystal display unit 68. In the embodiment of FIG. 13, transparent segment electrodes 94 are formed on the glass substrate 66, whereas the common reflection electrode 96 made of aluminum is formed on the rear glass substrate 58. The spacer 48 determines the cavity in which the liquid crystal composition 50 is filled.

In the embodiment of FIG. 14, a common transparent electrode 98 is formed on the glass substrate 66, whereas segment electrodes 100 of the reflection type made of aluminum are formed on the rear glass substrate 58. The liquid crystal composition 50 is filled in the cavity determined by the two glass substrates 58 and 66 and the spacer 48.

Figures 15, 16, 17:
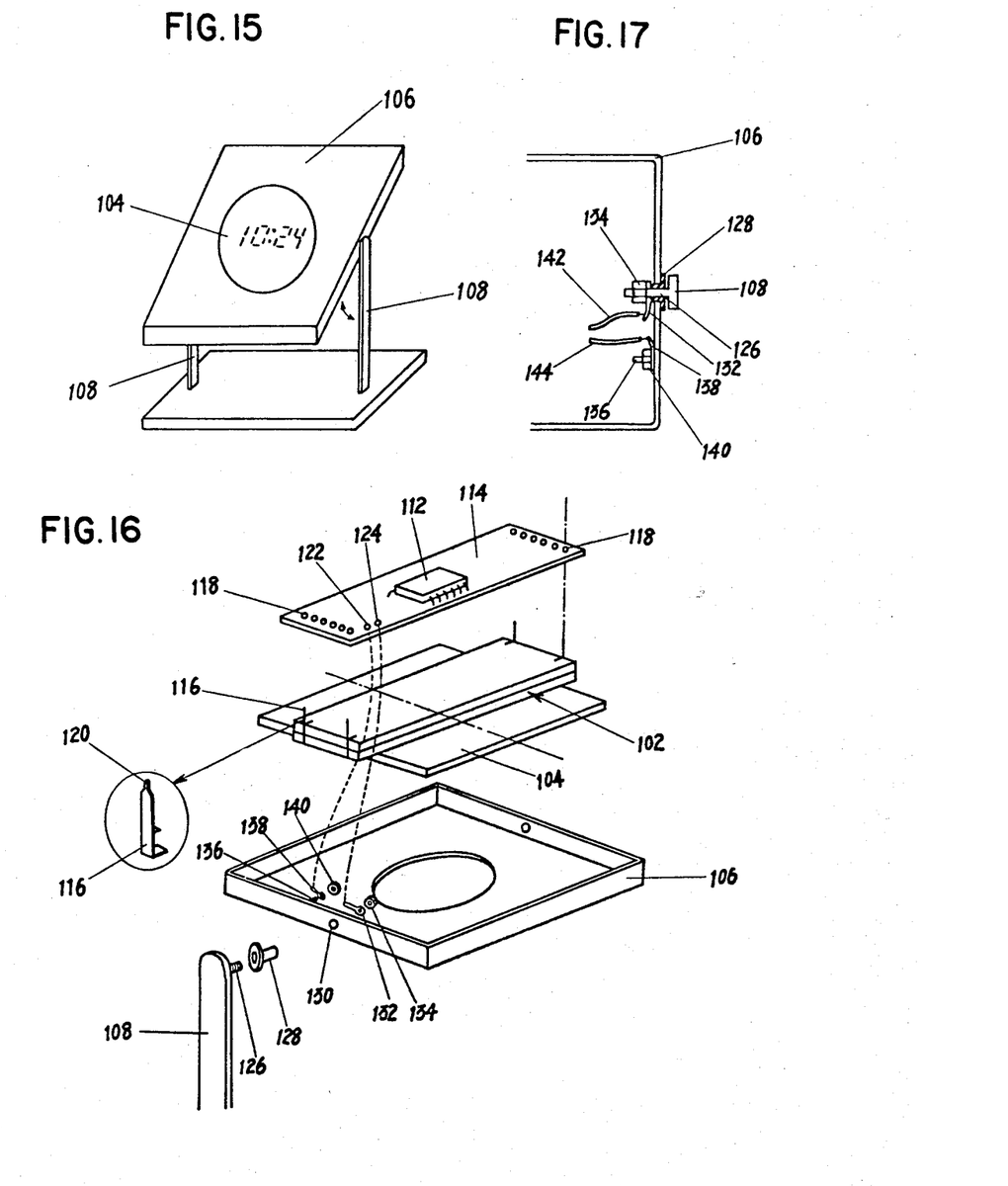
FIG. 15 is a perspective view of yet another embodiment of a mirror of the present invention including a liquid crystal display unit of the reflection type.
FIG. 16 is an exploded perspective view of the mirror body of the embodiment shown in FIG. 15.
FIG. 17 is a sectional view showing a hinge portion of the mirror of FIG. 15.

FIGS. 15 through 17 show still another embodiment of the mirror of the present invention.

A liquid crystal display unit 102 of the reflection type is disposed behind a front glass window 104 of a mirror body incorporated within a casing 106. The liquid crystal display unit 102 can be constructed as any one of the embodiements shown in the preceding drawings, for example, in FIGS. 5, 13 and 14. The casing 106 and supporting arms 108 for rotatably supporting the casing 106 are made of metal, and act as the switching terminals for controlling the enable and disable of the liquid crystal display unit 102.

Figure 18:
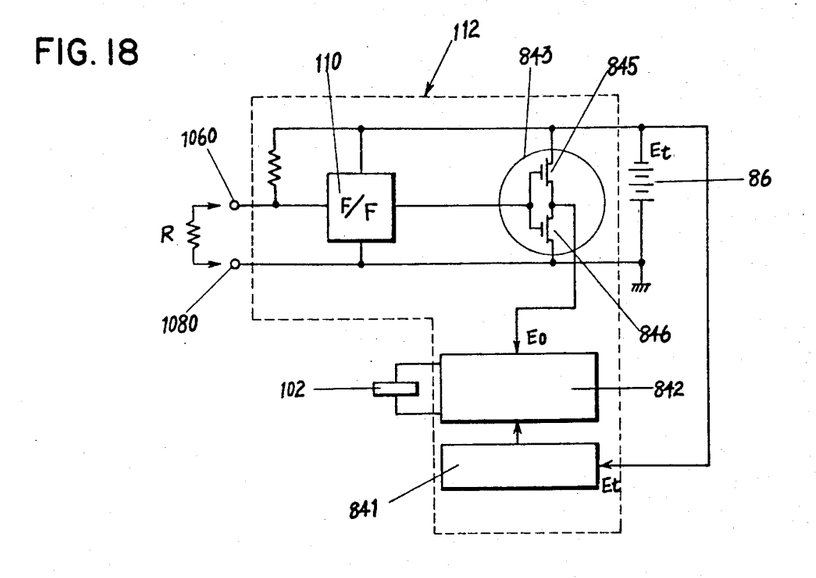
FIG. 18 is a schematic circuit diagram of a driving circuit for activating the liquid crystal display unit of FIG. 15.

The switching circuitry thereof is shown in FIG. 18. Like elements corresponding to those of FIG. 12 are indicated by like numerals. When the operator touches the casing 106 and the supporting arm 108, the condition of a T-type flip-flop 110 disposed between the input terminals and the C-MOS 843 is inverted, whereby the liquid crystal display unit 102 is disabled when the liquid crystal display unit 102 is initially energized. That is, the disable and the enable of the liquid crystal display unit 102 are alternatively repeated upon every touch operation by the operator to the casing 106 and the supporting arm 108.

An LSI 112 including the time calculation circuitry 841, the drive circuitry 842, the C-MOS 843 and the T-type flip-flop 110 is mounted on a printed wiring board 114 disposed at the back of the liquid crystal display unit 102. Electrical connection between the LSI 112 and the segment electrodes or common electrode of the liquid crystal display unit 102 is achieved through connection pins 116 connected to the respective electrodes of the liquid crystal display unit 102 and connecting holes 118 formed at the both ends of the printed board 114, the connection pins 116 being inserted into the connecting holes 118. Protruded ends 120 of the connection pins 116 are soldered to ensure the electrical connection and to mechanically support the printed board 114.

The electrical connection between input terminals 1060 and 1080 of the LSI 112 and the casing 106 and the supporting arm 108 is achieved in the following manner.

The input terminals 1060 and 1080 are connected to connection holes 122 and 124 formed on the printed board 114. The supporting arm 108 is mechanically connected to the casing 106 via a screw 126 connected to the supporting arm 108, an insulating ring 128, a through hole 130, a washer 132, and a nut 134. By providing the insulating ring 128, the casing 106 is rotatably supported by the supporting arms 108 and is electrically isolated from the supporting arms 108. Another screw 136 is fixed to the side wall of the casing 106. Another washer 138 and another nut 140 are fixed to the screw 136. The above washers 132 and 138 are electrically connected to the input terminals 1080 and 1060 of the LSI 112 via the connection holes 124 and 122 and wires 142 and 144, respectively.

Figure 19:
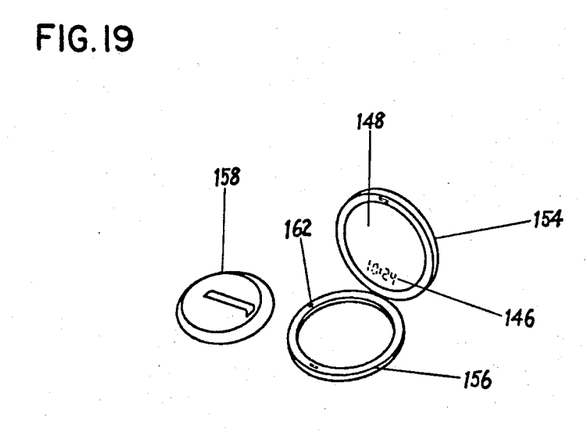
FIG. 19 is a perspective view of a further embodiment of a mirror of the present invention including a liquid crystal display unit of the reflection type.
Figure 20:
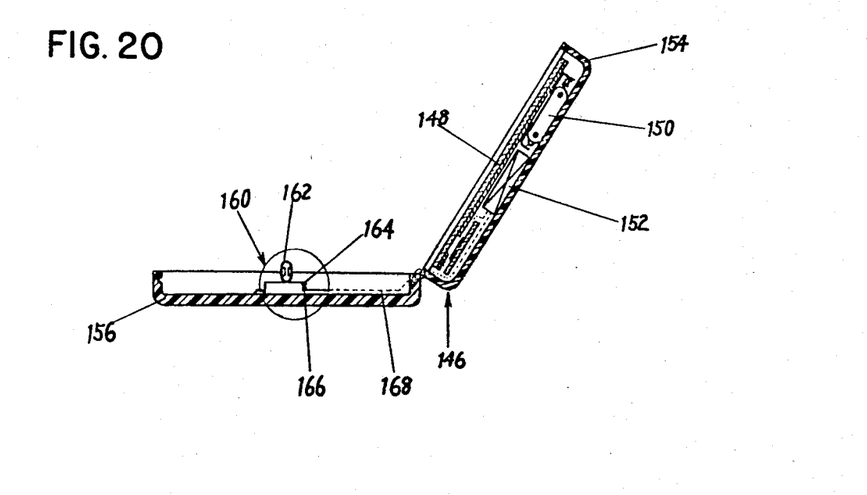
FIG. 20 is a sectional view of the mirror of FIG. 19.

FIGS. 19 and 20 show a further embodiment of the mirror of the present invention.

A liquid crystal display unit 146 is disposed at the back of a front glass window 148 of a mirror. The liquid crystal display unit 146 can be constructed in a same manner as described in conjunction with the foregoing drawings. The mirror, the liquid crystal display unit 146, a battery 150 and an LSI 152 are disposed in a casing 154 which is rotatable above a bottom casing 156 from its open condition to its closed condition. The LSI 152 comprises a time calculation means and a driving means for indicating the current time information on the liquid crystal display unit 146 as already discussed above. A puff 158 can be retained within the bottom casing 156, whereby the embodiment shown in FIGS. 19 and 20 acts as a compact.

A switching means 160 is provided on the side wall of the bottom casing 156, the switching means 160 functioning as the switching terminals 34 and 36 shown in FIGS. 1 and 3. The switching means 160 comprises a protruded knob 162, and two contacts 164 and 166. When the casing 154 is closed on the bottom casing 156, the switching means 160 is closed and, hence, the liquid crystal display unit 146 is disabled. A connection means 168 is provided for electrically connecting the switching means 160 to the LSI 152 and the battery 150.

FIGS. 21 through 26 show embodiments of the present invention, wherein the mirror including the liquid crystal display is incorporated in a compact which contains an electronic calculator therein.

Figure 21:
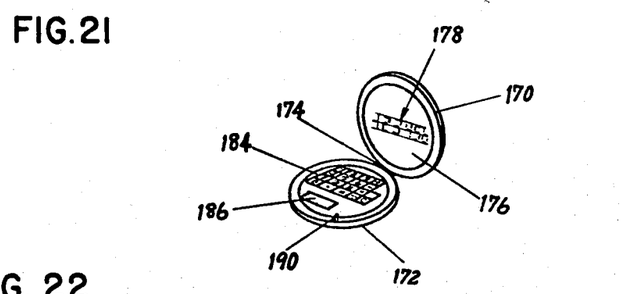
FIG. 21 is a perspective view of an embodiment of an electronic calculator including an indication section of the present invention.
Figure 22:
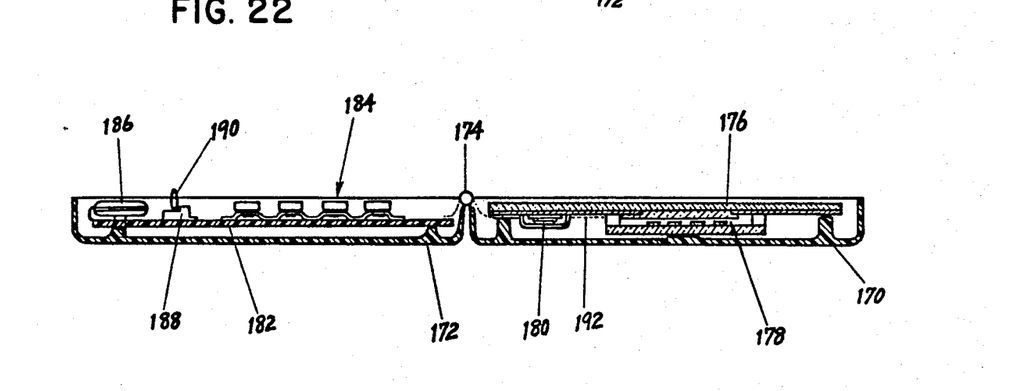
FIG. 22 is a sectional view of the electronic calculator of FIG. 21.

Referring now to FIGS. 21 and 22, a cover casing 170 is rotatable above a bottom casing 172 around a hinge portion 174. The cover casing 170 contains a mirror assembly 176, a liquid crystal display unit 178 attached to the back of the mirror assembly 176, and an LSI 180 for performing the calculation operation. The liquid crystal display unit 178 and the mirror assembly 176 can be constructed in accordance with the foregoing embodiments.

The bottom casing 172 contains a printed board 182 on which a keyboard means 184 for information entry, a battery 186 for power supply, and a switching means 188 for controlling the power supply to the LSI 180 and the liquid crystal display unit 178 are mounted. The switching means 188 comprises a protruded knob 190 which will be depressed when the cover casing 170 is closed on the bottom casing 172, thereby to preclude the power supply to the LSI 180 and the liquid crystal display unit 178. The cover casing 170 and the bottom casing 172 are electrically connected with each other through the use of a flexible film substrate 192 made of, for example, polyimide. One such flexible film substrate which may be used with this embodiment is that shown and described in U.S. Pat. No. 4,104,728 entitled ELECTRONIC APPARATUS EQUIPPED ON A FLEXIBLE SUBSTRATUM, issued on Aug. 1, 1978, by Takeshi Kasubuchi, assigned to the same assignee as the present invention, the disclosure of which is incorporated by reference herein.

Figure 23:
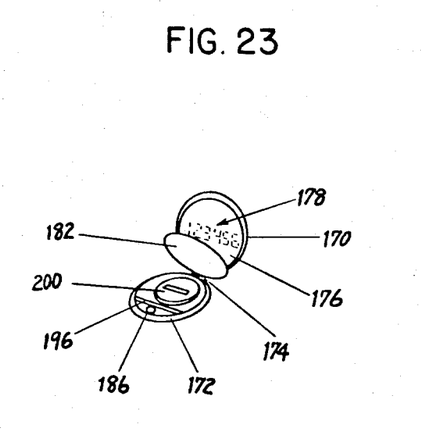
FIG. 23 is a perspective view of another embodiment of an electronic calculator including an indication section of the present invention.
Figure 24:
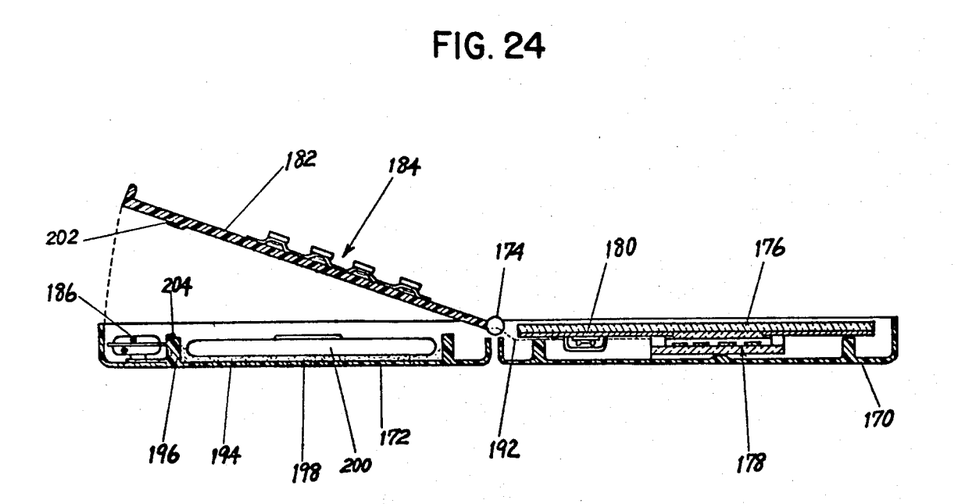
FIG. 24 is a sectional view of the electronic calculator of FIG. 23.

Referring now to FIGS. 23 and 24, the printed board 182 carrying the keyboard means 184 is rotatable about the hinge portion 174. Like elements corresponding to those of FIGS. 21 and 22 are indicated by like numerals. A cavity 194 is provided in the bottom casing 172 through the use of a wall 196. Face powder 198 and a puff 200 are retained in the cavity 194 which are exposed to the environment when the printed board 182 is rotated upward. Electrical connection between the printed board 182 and the battery 186 is achieved by contacts 202 and 204 formed on the rear surface of the printed board 182 and the wall 186, respectively. The contacts 202 and 204 are connected with each other when the printed board 182 is closed on the bottom casing 172. In this case, an additional conventional switching means is required to control the power supply to the keyboard means 184, the liquid crystal display unit 178 and the LSI 180. Such a switching means has been omitted from the drawings for the purpose of simplicity.

Figure 25:
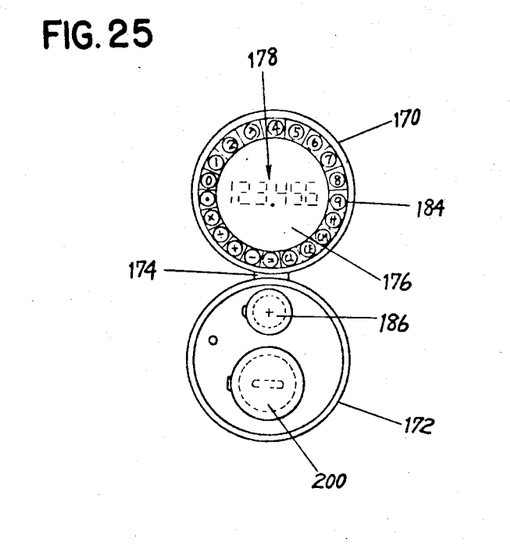
FIG. 25 is a perspective view of still another embodiment of an electronic calculator including an indication section of the present invention.
Figure 26:
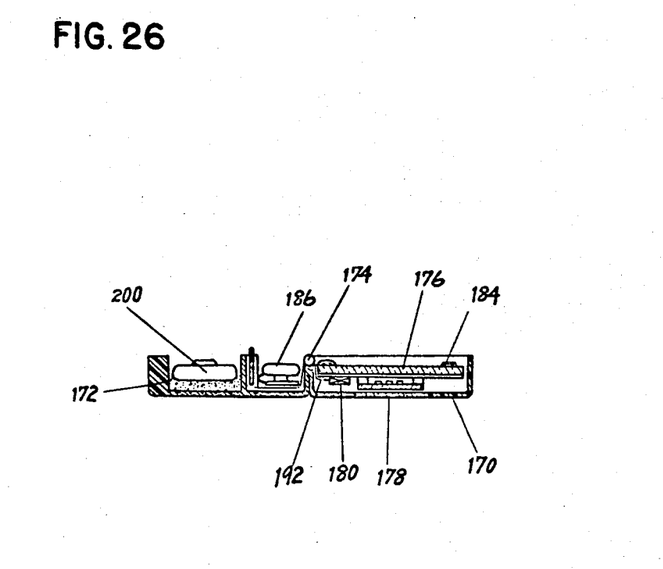
FIG. 26 is a sectional view of the electronic calculator of FIG. 25.

Referring now to FIGS. 25 and 26, the keyboard means 184 are provided in the cover casing 170. Like elements corresponding to those of FIGS. 21 through 24 are indicated by like numerals. The keyboard means 184 is positioned to surround the mirror assemby 176. Electrical connection between the keyboard means 184 and the LSI 180 can be achieved through the use of conventional technique. One example for achieving the electrical connection therebetween is to provide through holes in the glass substrate of the mirror assembly 176.

Although in foregoing embodiments the liquid crystal display units are employed, light emitting diode assemblies and electroluminescent elements can be employed in the display section. In this case the display section is preferably made of a half-mirror.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A selectively operable mirror and digital information display combination, comprising:
    a front glass window having a reflection film on the rear surface thereof to form a mirror of a predetermined height;
    a digital information display behind the front glass window for displaying characters of predetermined heights through the front glass window, said digital information display including a liquid crystal display unit of the reflection type, said reflection film being removed at a position where said liquid crystal display unit is attached;
    said predetermined height of said mirror being at least several times higher than the height of said characters; and
    a mode selection switch provided for enabling said digit information display to operate said combination in a display mode and disabling said digit information display to operate said combination in a mirror mode.

2. The mirror of claim 1, wherein the liquid crystal display unit includes a reflection means; and wherein the reflection film on said glass window and said reflection means of said liquid crystal display unit form, in combination, a continuous mirror surface.

3. The invention defined in claim 1 which further includes:
    a frame for supporting said front glass window; and
    said mode selection switch is mounted on said frame.

4. The mirror of claim 3, in which said mode selection switch mounted on the frame comprises cooperative interleaved electrodes extending about the periphery of said frame and being responsive to touch to selectively enable and disable said digital display.

5. The mirror of claim 4, wherein the digital display is made of a liquid crystal display unit of the reflection type.

6. The mirror of claim 5, wherein the reflection means is removed at a position where the liquid crystal display unit of the reflection type is disposed.

7. The mirror of claim 6, wherein the reflection means and reflection electrodes of the liquid crystal display unit form, in combination, a continuous mirror surface.

8. The mirror of claim 5, wherein the liquid crystal display unit of the reflection type is removably attached to the rear surface of the front glass window.

9. The mirror of claim 3, wherein the mirror is contained in a cover casing of a compact.

10. The mirror of claim 3, which further comprises a battery disposed in the frame; a time calculation circuit disposed in the frame; and a driver circuit disposed in the frame for driving the digital display, whereby the digital display provides indication of current time information through the front glass window.

11. The mirror of claim 9, which further comprises a battery disposed in a bottom casing of the compact; a computation circuit disposed in the bottom casing of the compact; a keyboard means disposed in the bottom casing of the compact; and a driver circuit disposed in the cover casing of the compact for driving the digital display, whereby the digital display provides indication of the computation result through the front glass window.

12. Combined digital display and mirror means comprising:
    a front glass window defining a major mirror surface area of a predetermined height;
    a reflective surface substantially coextensive with said major mirror surface area disposed behind the obverse surface of said front glass window;
    a digital liquid crystal information display means of the reflective type for displaying characters of predetermined heights within a discrete minor portion of said major mirror surface area;

said height of said major mirror surface being at least several times higher than the height of said characters; and said information display means, when operative in a display mode, displaying digital information characters through said front glass window and when not operative in a display mode constituting an integral continuation of said major mirror surface area.

13. The combined digital display and mirror means of claim 12 which further includes mode selection switch means for enabling said digital information display to operate said combined means in a display mode and disabling said digital information display to operate said combined means in a mirror mode.

14. The combined digital display and mirror means of claim 13, wherein said mode selection switch means comprises touch responsive switch means.

15. The combined digital display and mirror means of claim 14, wherein said touch responsive switch means comprises contact means selectively bridged by the touch of an operator;

a T-type flip-flop means responsive to a bridged condition of said contact means to change state; and circuit means responsive to said change of state of flip-flop means to enable and disable said display means respectively alternate occurrences of a bridged condition of said contact means.

16. The mirror of claim 3, wherein said mirror is contained in a cover casing of a closable compact; and wherein said mode selection switch is mounted in said cover casing and responsive to a closing thereof to disable said digital display while said compact is closed and responsive to actuation by an operator to selectively enable and disable said digital display when said compact is open.

17. The mirror of claim 3, wherein said mirror is contained in a cover casing of a closable compact; and wherein said mode selection switch is mounted in said cover casing and responsive to a closing thereof to disable said digital display while said compact is closed and responsive to actuation by an operator to selectively enable and disable said digital display when said compact is open; and which further comprises a battery disposed in the frame; a time calculation circuit disposed in the frame; and a driver circuit disposed in the frame for driving the digital display, whereby the digital display provides indication of current time information through the front glass window.

18. The mirror of claim 3, wherein said mirror is contained in a cover casing of a closable compact; and wherein said mode selection switch is mounted in said cover casing and responsive to a closing thereof to disable said digital display while said compact is closed and responsive to actuation by an operator to selectively enable and disable said digital display when said compact is open; and which further comprises a battery disposed in a bottom casing of the compact; a computation circuit disposed in the bottom casing of the compact; a keyboard means disposed in the bottom casing of the compact; and a driver circuit disposed in the cover casing of the compact for driving the digital display, whereby the digital display provides indication of the computation result through the front glass window.

* * * * *